Robert J. Schwartz
INVENTOR.

BY Edward M. Roney

ATTORNEY

WELL LOGGING PULSE TRANSMISSION SYSTEM

Filed Aug. 10, 1967 5 Sheets-Sheet 2

Robert J. Schwartz
INVENTOR.

BY Edward M. Roney

ATTORNEY

Robert J. Schwartz
INVENTOR.

BY Edward M. Roney
ATTORNEY

Robert J. Schwartz
INVENTOR.

BY Edward M. Roney
ATTORNEY

Robert J. Schwartz
INVENTOR.

BY Edward M. Roney
ATTORNEY

United States Patent Office 3,559,163
Patented Jan. 26, 1971

3,559,163
WELL LOGGING PULSE TRANSMISSION SYSTEM
Robert J. Schwartz, Houston, Tex., assignor to Schlumberger Technology Corporation, Houston, Tex., a corporation of Texas
Filed Aug. 10, 1967, Ser. No. 659,783
Int. Cl. G01v *1/40*
U.S. Cl. 340—18 32 Claims

ABSTRACT OF THE DISCLOSURE

The particular embodiments described herein as illustrative of the invention describe a technique for transmitting pulses at the maximum permissible rate of a transmission system without losing any pulses. In one form, the data pulses are stored in an up-down binary counter. The counter is examined at a specified minimum time interval to determine if any counts are present, and if so, a pulse is transmitted to the surface of the earth and one count is subtracted from the counter. Suitable means are shown for insuring that the counter is not placed in the count-up and count-down mode at the same time and to insure that the counter is not reset or cycled around by counting a pulse when it is full. In another form, the transmission rate is effectively doubled by generating a change in state for each pulse or event to be transmitted. This transmission system can be used with the pulse storage technique to further improve the transmission rate. Other embodiments show multiplexing pulses from a plurality of pulse sources in the tool to the surface of the earth. The above-mentioned counting technique is shown utilized with these multiplexing techniques to insure that pulses are not lost during periods of high instantaneous pulse rate from one or more of the pulse sources. Means are also shown for synchronizing the decommutating operation at the surface of the earth with the commutating operation downhole, including detecting the synchronizing signals and synchronizing the frequency and phase of the downhole commutating clock with the surface decommutating clock.

This invention relates to methods and apparatus for transmitting information from a well tool in a borehole to the surface of the earth over a conductor pair, such as a monocable. More particularly, the invention relates to the transmission of pulses derived from a tool in a borehole, such as for example a radioactivity logging tool, over a conductor pair to the surface of the earth.

It is common practice to transmit pulses representative of information measured by a well tool in a borehole over a conductor pair to the surface of the earth. The source of these pulses may take the form of a scintillation detector used in radioactivity logging wherein a photomultiplier tube which is disposed adjacent to a suitable crystal generates pulses whenever a gamma ray strikes the crystal. Another common manner of utilizing pulses for the transmission of information to the surface of the earth occurs where an analog type signal is converted to a pulse rate, as by a standard integrator triggering a voltage sensitive trigger which in turn resets the integrator. In this manner, pulses are generated at a rate depending on the magnitude of the current feeding the integrator.

In either case, it may happen that the rate at which the pulses are generated for transmission over the conductor pair to the surface of the earth will exceed, at least for a short time, the frequency response of the cable and the peripheral equipment connecting the cable to the downhole and surface electronics. This frequency response can be affected by such things as the cable capacitance, and filters at the tool and at the surface of the earth. These filters are usually present to filter out the low frequency power which is many times supplied over the same conductor pair that is utilized for pulse transmission. For many applications, if low frequency power is not supplied over the same conductor pair which is utilized for pulse transmission, the frequency response of the cable itself is sufficient for the maximum pulse rate expected. However, there are many cases where the instantaneous frequency of pulses derived from the pulse source in the tool is greater than the frequency response of the cable itself, although the average is less than that of the cable in which case some of the transmitted pulses will not be detected at the surface of the earth.

It would therefore be desirable to transmit all of the pulses to the surface of the earth which are generated by the downhole pulse source, but yet control the instantaneous pulse rate at which these pulses are transmitted to the surface of the earth so that each and every pulse transmitted to the surface of the earth will be detected. It would also be desirable, in this connection, to devise techniques for improving the transmission capabilities beyond what is normally permissible for a particularly transmission medium.

It is sometimes desirable to transmit pulses over a transmission medium to the surface of the earth from a plurality of pulse sources. Various prior art schemes have been suggested for doing this, but they consist primarily of first converting the pulses from the various downhole pulse sources to analog signals whose magnitudes are proportional to the pulse rate of the respective pulse sources and then multiplexing this information to the surface of the earth. However, this is undesirable for many applications due to the harsh environmental conditions, such as temperature, in the downhole tool. For example, the wide temperature range encountered in a borehole may cause the downhole circuitry to drift thus causing the analog signals to be in error. Also, switching transients caused by the multiplexing operation may be introduced into the signal components. Another problem that may occur is that the switching circuits may tend to introduce undesired pedestal components into the composite signal transmitted to the surface of the earth. Such pedestal components are generally in the form of steady DC background signals which are present in the switching circuits and are superimposed on the desired data signal and which pedestal components may vary from one switching circuit to the next.

To circumvent these problems, the most desirable solution is to transmit the pulses themselves to the surface of the earth so that the pulse rate can be accurately determined at the surface of the earth. That is to say, the precise amplitude of each pulse is unimportant when determining pulse rate so long as it can be accurately determined whether a pulse has been transmitted at all. However, it can be appreciated that when transmitting pulses generated from various pulse sources, the maximum permissible pulse rate for each pulse source will be severely limited since each pulse source only has a fraction of the band with of the pulse transmission system in this case. The rate of sampling the various pulse sources in the downhole tool can be selected in accordance with the frequency response of the transmission system. However, since the effective maximum pulse repetition rate for each pulse source is severely limited where information from a plurality of sources is transmitted, there is a danger that the pulse rate for one or more of the downhole pulse sources may, at times, be greater than the maximum permissible pulse repetition rate of the transmission system for each pulse source. Therefore, it would be desirable that pulses from a plurality of pulse sources in a well tool be transmitted to the surface of the earth in a multiplexed fashion without losing any of the pulses generated by the various downhole pulse sources.

When multiplexing information to the surface of the earth, it is generally necessary to provide a timing source or free running pulse generator in the downhole electronics to control the multiplexing operation and to transmit a synchronization signal over the conductor pair to the surface of the earth so that the surface detecting circuitry can accurately separate the multiplexed data in the composite multiplexed signal. However due to the harsh downhole environmental conditions, it is possible that the frequency of this timing source may vary, thus giving rise to the possibility that the detecting circuitry at the surface of the earth will not be synchronized with the multiplexed data in the composite multiplexed signal.

It is therefore an object of the present invention to provide new and improved methods and apparatus for transmitting data from a well tool in a borehole to the surface of the earth.

It is another object of the present invention to provide new and improved methods and apparatus for transmitting data from a well tool in a borehole to the surface of the earth wherein the maximum frequency response of the pulse transmission system is utilized without losing any of the pulses generated by a downhole pulse source.

It is still a further object of the invention to provide new and improved methods and apparatus for transmitting pulses derived from a plurality of pulse sources to the surface of the earth.

In accordance with one feature of the invention, methods and apparatus for processing pulse type signals for transmission from a tool in a borehole to the surface of the earth on a transmission medium comprise generating information pulses in a tool. In one form, a transmission signal is generated for transmission to the surface of the earth in response to the information pulses, which transmission signal changes state or amplitude level for each generated information pulse. In another form, the generated information pulses are counted by a digital counting. The counting means is then interrogated to determine if any pulses are stored therein, and if so, a transmission pulse is supplied to the transmission medium for transmission to the surface of the earth and a count is subtracted from the counting means. By controlling the rate of interrogation, the transmission repetition rate can be maintained less than the maximum permissible repetition rate of the transmission system regardless of the instantaneous repetition rate of the pulse source.

Another form of the invention includes generating pulses from a plurality of pulse sources and individually storing the pulses from each pulse source in individual digital counting means. Then the individual counting means are sequentially interrogated to enable pulses corresponding to each pulse source to be supplied to the transmission medium on a time sharing basis.

In accordance with another feature of the invention, a method and apparatus for decommutating signals transmitted on a time sharing basis from a plurality of sources in a well tool in a borehole to the surface of the earth, wherein synchronization signals are also transmitted, and supplying the decommutated signals to separate utilization means comprises receiving the transmitted signals at the surface of the earth and gating the signals corresponding to each source in the tool to its respective utilization means. In one form of the invention, a decommutation timing means is responsive to the synchronization signals to cause the proper signal to be gated to the proper utilization means. In another form of the invention, the signals received at the surface are stored and examined for a synchronization condition before the signals are gated to the utilization means. Another feature of the invention includes adjusting the timing of the decommutating timing means to correspond with the frequency of the transmitted signals, i.e., the frequency of the downhole commutating operation.

For a better understanding of the present invention, together with other and further objects thereof, reference is had to the following description taken in connection with the accompanying drawings, the scope of the invention being pointed out in the appended claims.

Referring to the drawings.

Figure 1:
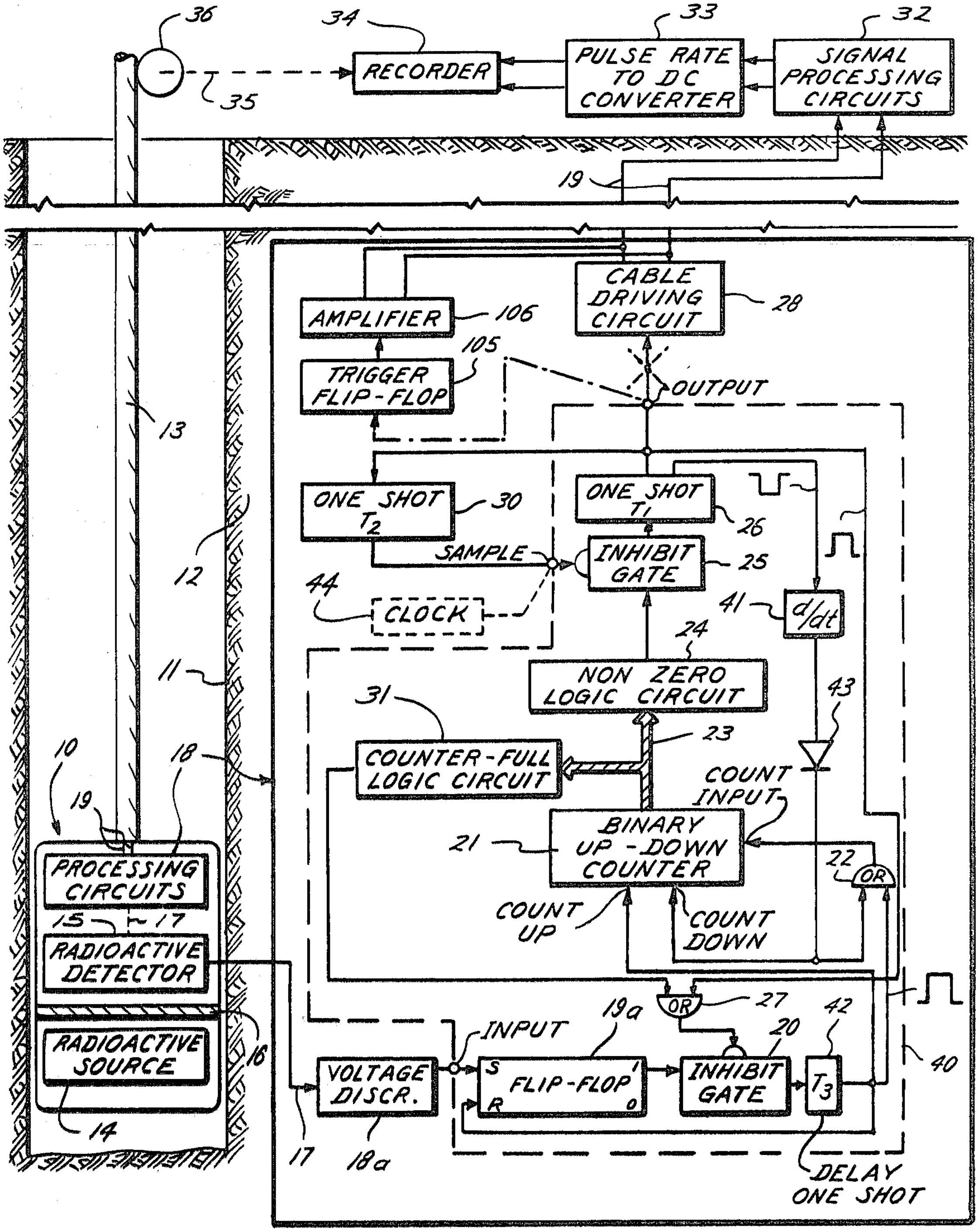
FIG. 1 shows a well logging tool in a borehole along with apparatus for transmitting information derived from the well tool to the surface of the earth in accordance with the present invention.

Now, referring to FIG. 1, there is shown a downhole well logging tool 10 in a borehole 11 for investigating subsurface earth formations 12. The tool 10 is supported in the borehole 11 on the end of an armored multiconductor cable 13. The tool 10 is shown having a radioactive source 14 and radioactivity detector 15 with a suitable radioactivity shield 16 disposed therebetween for preventing the particles from the radioactive source from directly striking the detector 15. The radioactive detector 15, in the usual manner, might comprise a suitable crystal, such as sodium iodide and a photomultiplier tube disposed adjacent thereto. The voltage source to the photomultiplier tube is not shown but is nevertheless assumed to be present. In the usual manner, particles from the radioactive source bombard the adjacent formations thus causing gamma rays for example to be emitted therefrom. These emitted gamma rays strike the crystal of the radioactive detector thus causing pulses of light to be emitted from the crystal which are converted by the photomultiplier tube into voltage pulses each time a pulse of light is emitted from the crystal. These voltage pulses are supplied via a conductor 17 (shown as a dotted line) to signal processing circuits 18 which transmit the pulses to the surface of the earth via the conductor pair 19 (shown as dotted lines) through the multiconductor cable 13. It is to be understood that the radioactivity logging apparatus shown in FIG. 1 is only exemplary and any type of logging apparatus could be utilized in place thereof. It is also to be understood that the cable 13 could comprise a single conductor cable with armor, commonly referred to as a monocable, a multiconductor cable, or any other transmission medium. Likewise, the power supplied to the tool 10 from the surface of the earth is not shown (but presumed to be present) and could be supplied to the tool 10 on another conductor pair or on the conductor pair 19 in the usual manner, or be self-contained.

Now concerning the improvement of the present invention, the circuitry enclosed within the box 18 is the circuitry which is contained within the signal processing circuits for the tool 10. The conductor 17 from the radioactive detector 15 to the signal processing circuit 18 supplies the pulses from the photomultiplier tube or radioactive detector 15 to a suitable voltage discriminator 18_a_.

which acts to pass only those pulses above or within a given amplitude level or range. The output information pulses from voltage discriminator 18 are applied to the "input" terminal of a pulse storage and logic circuit 40. This input terminal is connected to the set input of a flip-flop 19*a*, the "one" output from flip-flop 19*a* being applied to the input of an inhibit gate 20. When the inhibit gate 20 is unenergized, these pulses from flip-flop 19, after a delay of time duration $T_3$ by a delay circuit 42 (one-shot for example), are applied to the "count-up" command input of a binary up-down counter 21. The counter 21 is illustrated as a binary up-down counter but could take any other form for counting discrete events, including an analog counter. The pulse from delay 42 is also supplied through an OR gate 22 to the "count" input of the binary up-down counter 21, and back to the reset input of flip-flop 19*a*. Thus, if inhibit gate 20 is unenergized, a pulse from voltage distcriminator 18*a* will cause the binary up-down counter 21 to count up by one count. Thus, the binary up-down counter 21 will register, in binary form, the number of pulses from radioactive detector 15 which exceed the threshold level of voltage discriminator 18*a*.

The various stages of binary up-down counter 21 are connected by the conductor bundle 23 to a nonzero logic circuit 24 which provides a constant output signal so long as there is a "one" existing in any stage of the binary up-down counter 21. Thus, the nonzero logic circuit 24 could comprise an OR gate coupled to the "one" output of each stage of counter 21. This output signal from nonzero logic circuit 24 is supplied through an inhibit gate 25, when unenergized, to a one-shot or monostable multivibrator 26 having an on-time duration "$T_1$." The negative output pulse from one-shot 26 is supplied to the input of a differentiator 41. The positive pulse output thereof is supplied to one input of an OR gate 27, and to the output terminal of the pulse storage and logic circuit 40. This output terminal is connected to a suitable cable driving circuit 28, such as a blocking oscillator, which supplies a pulse to the surface of the earth for each output pulse from one-shot 26. The trailing positive pulse from differentiator 41 energizes the "count-down" command input of counter 21 via a forward-biased diode 43 and also supplies a pulse to the "count input" of counter 21 via the OR gate 22.

Thus, when there is a count existing in binary up-down counter 21 and inhibit gate 25 is unenergized, the nonzero logic circuit 24 or its equivalent will cause one-shot 26 to generate a pulse which is supplied to the surface of the earth via the conductor pair 19, and the binary up-down counter is caused to count-down by one count since the "count" and "count-down" inputs of counter 21 are energized by the trailing edge of the pulse output from one-shot 26. At the same time that the pulse from one-shot 26 is being generated, inhibit gate 20 is energized via OR gate 27, thus eliminating the possibility that binary up-down counter 21 will simultaneously be given a command to count-up and count-down. However, should a pulse be generated by radioactive detector 15 of sufficient amplitude to pass voltage discriminator 18*a* during this time, flip-flop 19*a* will store the generated pulse. The delay 42 serves the purpose of insuring that the counter 21 has sufficient time to change over from the count-down mode to the count-up mode, i.e., that a count-down pulse has propagated through the counter 21 and the counter 21 is ready to be counted up. In like fashion, by utilizing the trailing edge of the pulse output from one-shot 26, the counter 21 has sufficient time to change over from the count-up to count-down modes. The delay $T_3$ of delay circuit 42 should desirably be somewhat less than the pulse duration $T_1$ of the pulse generated from one-shot 26 to avoid interference at the counter 21.

The leading edge of each pulse from one-shot 26 triggers a one-shot 30 having an on-time $T_2$. The output from one-shot 30 is supplied to the sample terminal of the pulse storage and logic circuit 40. This sample terminal is connected to the control terminal of inhibit gate 25. Thus, it can be seen that inhibit gate 25 is energized for a time period $T_2$ after the initiation of the generation of a pulse by one-shot 26 for transmission via the conductor pair 19 to the surface of the earth. This time period $T_2$ is determined in accordance with the maximum permissible pulse rate of transmission to the surface of the earth. That is to say, since inhibit gate 25 is energized for this time period $T_2$, no other pulses can be generated for transmission to the surface of the earth during such time thus fixing the maximum possible repetition rate of pulses from one-shot 26. This insures that each pulse will be distinguishable at the surface of the earth but yet allows the maximum pulse rate possible for transmission to the surface of the earth. Alternatively, a clock 44 (oscillator) could be utilized to control the transmission rate by alternately energizing and deenergizing inhibit gate 25.

Concerning the operation of the pulse storage and logic circuit 40, there is a constant output signal from nonzero logic circuit 24 so long as there is a count in binary up-down counter 21, thus energizing one-shot 26 for generation of the pulses for transmission up the cable at the maximum repetition rate $1/T_2$. For each pulse transmitted to the surface of the earth, the counter 21 is counted down one count to account for this transmitted pulse, and the inhibit gate 20 is energized to prohibit a new pulse from being counted by binary up-down counter 21 while it is being counted down. At the end of the time period $T_2$, the operation is repeated again if there is a count in counter 21.

The counter 21 is prohibited from counting information pulses from voltage discriminator 18*a* only during the time that inhibit gate 20 is energized in addition to the delay time of one-shot 42. During the remainder of the time, pulses from radioactive detector 15 whose amplitudes exceed the threshold level of the voltage discriminator 18*a* will proceed to be counted up by the counter 21. Thus, it can be seen that if the rate of pulses from radioactive detector 15 which exceed the threshold level of voltage discriminator 18*a* become greater than the maximum permissible rate of the transmission system, these pulses will not be lost. (This pulse rate can very well exceed the maximum cable pulse rate at times because of the random nature of the pulses from radioactive detector 15.) Likewise any pulse from voltage discriminator 18*a* which occurs during the "count-down" mode of the operation of counter 21 will not be lost due to the buffer storage by flip-flop 19*a*.

Desirably, the binary up-down counter 21 should have enough stages to account for the maximum expected pulse rate from voltage discriminator 18*a*. However, in the event that the rate of pulses should ever exceed even this maximum expected rate, the counter 21 would cycle back to zero (or be reset). To guard against this occurrence, a "counter-full" logic circuit 31 is connected to the conductor bundle 23 to provide a constant output signal when the counter 21 becomes full. Thus, "counter-full" logic circuit could comprise an AND gate coupled to the "one" output of each stage of counter 21. This output signal from "counter-full" logic circuit 31 is supplied through the OR gate 27 to the control input of inhibit gate 20 to inhibit counter 21 from counting up. In the event that scaling of the pulses transmitted to the surface of the earth is desired, this could be accomplished in counter 21 by suitable means, or prior to flip-flop 19*a*.

Figures 2A, 2B, 2C, 2D, 2E, 2F, 2G:
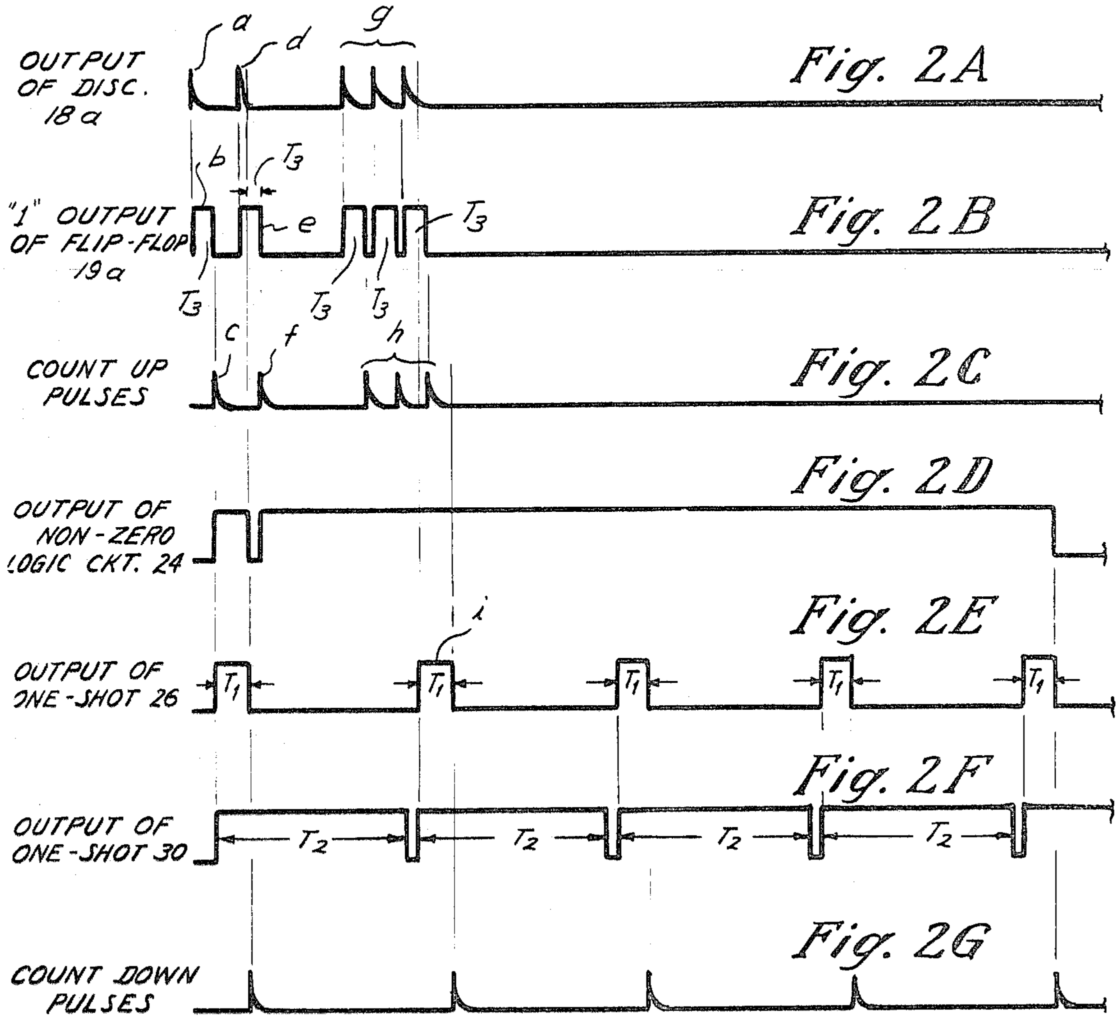
FIGS. 2A–2G show the voltage wave forms at various points in the FIG. 1 circuitry to give a better understanding of the operation thereof.

Now referring to FIGS. 2A–2G in conjunction with FIG. 1 to gain a better understanding of the operation of the apparatus of FIG. 1, FIG. 2A shows the output pulses from voltage discriminator 18*a* and FIG. 2B shows the wave form of the "1" output of flip-flop 19*a* which is energized by the pulses of FIG. 2A. FIG. 2C shows the count-up pulses applied to counter 21, which pulses are generated on the trailing edge of the pulses of FIG. 2D. The wave form of FIG. 2B represents the output of nonzero logic circuit 24 which causes the generation of the pulses of one-shot 26 shown in FIG. 2E. The leading edge of these pulses of FIG. 2E cause the generation of the output pulses from one-shot 30 shown in FIG. 2F and the trailing edge thereof causes the generation of the count-down pulses applied to counter 21, shown in FIG. 2G.

Now, considering the counter 21 to be initially empty, the first pulse of FIG. 2A, designated *a*, causes the "one" output of flip-flop 19*a* to turn on, thus energizing delay one-shot 42 for a time interval $T_3$, as represented by the pulse *b* in FIG. 2B. The trailing edge of this pulse *b* of FIG. 2B then causes a count-up pulse to be applied to counter 21 as represented by the pulse *c* in FIG. 2C. At the same time, the output of nonzero logic circuit 24 goes to the "one" state, thus energizing one-shots 26 and 30 as shown in FIGS. 2D, 2E and 2F.

Now assume that a second information pulse *d* is generated before the count-down pulse of FIG. 2G has been generated. This new information pulse of FIG. 2A causes flip-flop 19*a* to be again energized, as represented by the pulse *e* in FIG. 2B. However, since the output pulse from one-shot 26 (FIG. 2E) is energizing inhibit gate 20, the output from flip-flop 19*a* will not immediately energize the delay one-shot 42. After the output of one-shot 26 drops to zero after a time $T_1$, as shown in FIG. 2E, delay one-shot 42 is energized and after a delay time $T_3$, the counter pulse *f* of FIG. 2C will be generated to cause counter 21 to count-up by one count.

Thus, it can be seen that this time delay $T_3$ keeps the count-up pulse *f* from interfering with the previous count-down pulse of FIG. 2G. Likewise, by causing the counter 21 to countdown on the trailing edge of the pulses from one-shot 26, it can be seen that these count-down pulses will not interfere with the count-up operation. Now, assume that there are a succession of pulses *g* generated from discriminator 18*a* as shown in FIG. 2A. These pulses *g* will cause the output of flip-flop 19*a* to generate the pulses as shown in FIG. 2B thus causing the corresponding count-up pulses *h* of FIG. 2C to be supplied to the counter 21.

Now, assume that a new pulse *i* is generated from one-shot 26 during this time, as shown in FIG. 2E, it can be seen that the count-up pulse will be applied to counter 21 anyway (the last count-up pulse of the group *h*) and the count-down pulse corresponding to the output pulse *i* from one-shot 26 would not interfere with this count-up operation. Looking at FIGS. 2E, 2F and 2G, it can be seen that a pulse train (FIG. 2E) is transmitted up the cable to the surface of the earth and the counter 21 is counted down for each pulse generated (FIG. 2G). When enough pulses have been transmitted to the surface of the earth to empty the counter 21, the output of nonzero logic circuit 24 will drop to the "zero" state, as shown in FIG. 2D. Thereafter, the operation, then, proceeds in the manner just described.

Concerning the circuitry at the surface of the earth, the pulses on conductor pair 19 are applied to suitable signal processing circuits 32 which may comprise suitable amplification, pulse shaping, and automatic gain control circuits. The output from signal processing circuits 32 are applied to a standard pulse rate to DC converter 33 which provides a varying DC signal proportional to the received pulse rate. This DC signal is recorded on a recording medium of a suitable recorder 34. The recorder 34 is driven by a shaft 35 which is coupled to a rotating wheel 36 which rotates in accordance with the movement of the cable 13 in and out of the borehole so as to provide a log of the gamma ray pulse rate versus depth.

It is to be understood that the pulses received at the surface of the earth are not received in precisely the same time relationship with which they are generated from the radioactive detector if pulses are being stored in counter 21. However, in the usual manner, the pulse rate to DC converter has a suitable statistical averaging circuit anyway (i.e., a long time constant). That is, the circuit is responsive to the average rate of a number of pulses occuring over a substantial period of time. Thus, this time relationship discrepancy should not produce any noticeable error. At any rate, compared with errors caused by losing pulses, any time relationship error will be negligible.

Figure 3:
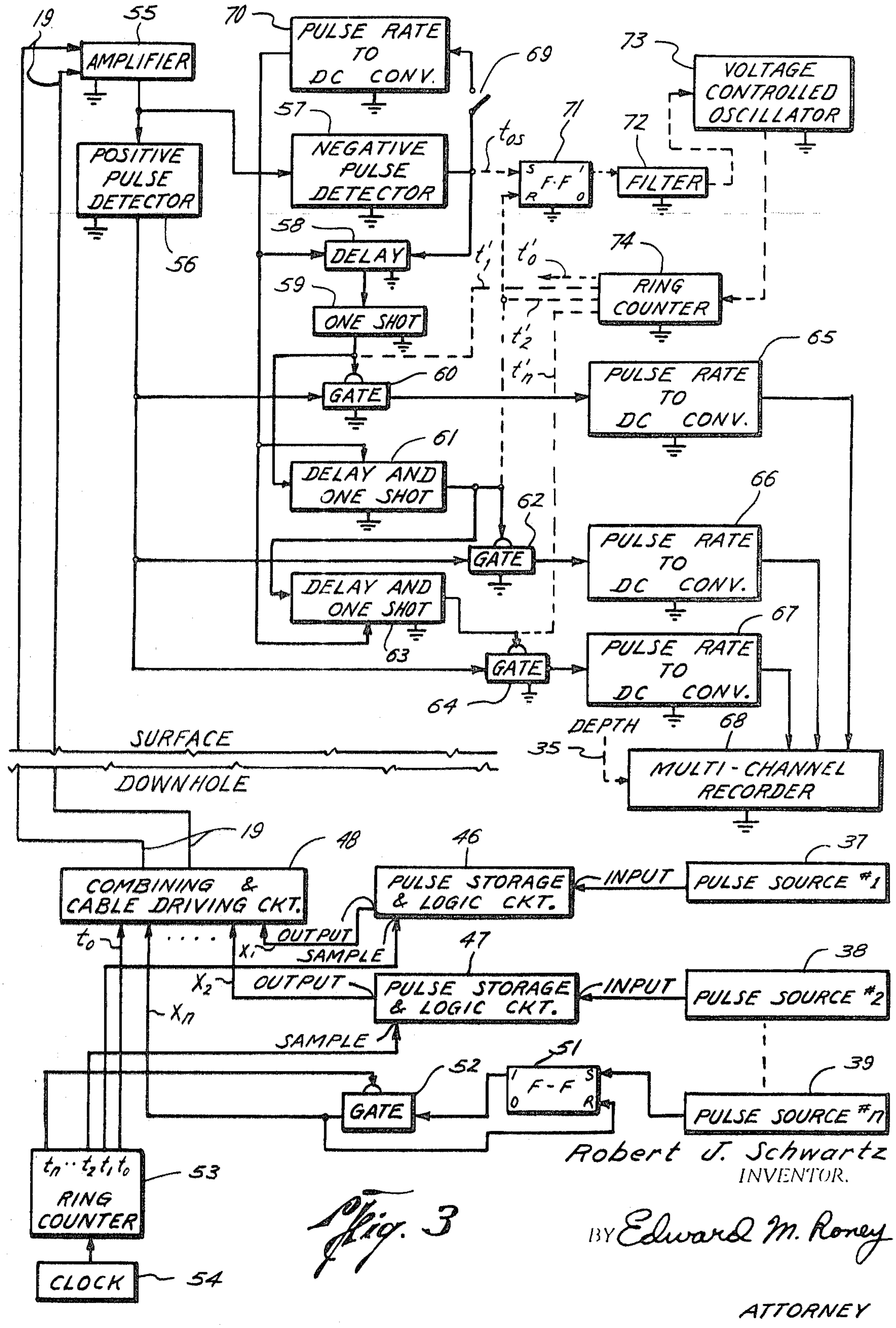
FIG. 3 shows a plurality of pulse sources along with apparatus for transmitting the information from all of the downhole pulse sources to the surface of the earth along with apparatus at the surface of the earth for processing the transmitted information in accordance with another embodiment of the present invention.

Referring now to FIG. 3, there is shown apparatus for transmitting information pulses from a plurality of pulse sources to the surface of the earth on a time sharing basis. Looking first at the downhole circuitry, there are shown a plurality of pulse sources 37, 38 and 39 designated pulse source #1, pulse source #2, and pulse source *n*. There could be any number of such pulse sources and they could comprise any type of pulse generating apparatus such as the gamma ray apparatus of FIG. 1.

The pulse source #1 supplies pulses to the input terminal of a pulse storage and logic circuit 46, which is identical in construction to the pulse storage and logic circuit 40 of FIG. 1. The pulse source #2 supplies information pulses to the input terminal of a second pulse storage and logic circuit 40, again, identical to the circuit 40 of FIG. 1. The *n*th pulse source 39 supplies pulses to the set input of a flip-flop 51 whose "1" output is supplied to a gate circuit 52. The output from gate circuit 52, as well as the outputs from pulse storage and logic circuits 46 and 47 are supplied to a combining and cable driving circuit 48. The output from gate circuit 52 is also supplied back to the reset input of flip-flop 51.

To sample or interrogate the pulse storage and logic circuits 46 and 47, as well as flip-flop 51 by energizing gate 52, of the pulses derived from the various pulse sources, a suitable ring counter 53 driven by a clock 54 is provided as a timing means. The clock 54 could comprise, for example, an astable multivibrator. The ring counter 53 has a plurality of output leads designated $t_1$, $t_2$ . . . and $t_n$ which supply pulses to the sample terminals of pulse storage and logic circuits 46 and 47, and gate 52 on a time sharing basis. A synchronization pulse $t_0$ is also generated from ring counter 53. Ring counter 53 can be considered to have suitable pulse generating means such as a one-shot on the output of each stage of the ring counter to provide short time duration pulses. The output pulses from pulse storage and logic circuits 40 and 40*a* and flip-flop 51, are considered to be positive pulses. The synchronization pulse $t_0$ from ring counter 53 is considered to be a negative pulse. In this manner, it can be seen that the synchronization pulse $t_0$ is of the opposite polarity from the data pulses designated $x_1$, $x_2$, and $x_n$, which are generated by the pulse storage and logic circuits 46 and 47, and flip-flop 51 when sampled. Thus, the synchronization pulses can be readily distinguished from the data pulses $x_1$, $x_2$ . . . and $x_n$ at the surface of the earth.

Figures 4A, 4B, 4C, 4D, 4E:
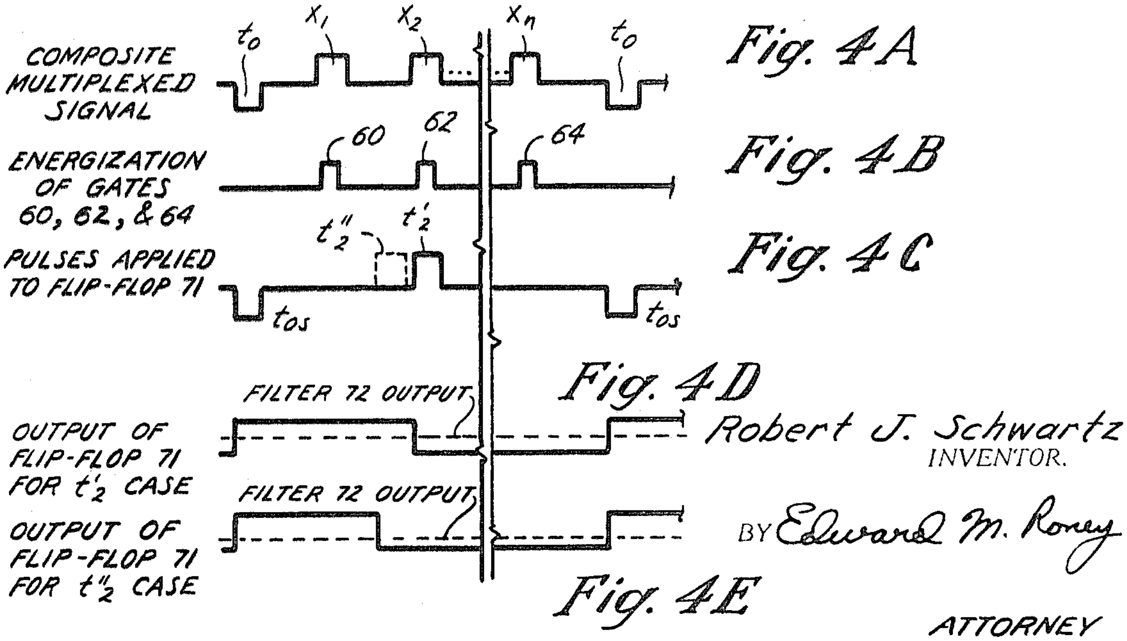
FIGS. 4A–4E show voltage wave forms at various points in the FIG. 3 circuitry for purposes of explaining the operation of the FIG. 3 apparatus.

Referring to FIG. 4*a*, there is shown the wave form of a typical composite multiplexed signal transmitted to the surface of the earth. It can be seen that the synchronization pulse $t_0$ is negative while the data or information pulses $x_1$ and $x_2$ are positive.

In operation, it can be seen that the clock driven ring counter 53 samples the pulse storage and logic circuits 46 and 47 and flip-flop 51 via gate 52 during given time intervals, which time intervals have a fixed time relationship to each other and to the synchronization pulse $t_0$. It can also be seen that the pulse storage and logic circuits 46 and 47 and flip-flop 51 store the pulses from the various pulse sources so that they will be available for transmission at the proper time. Furthermore, the pulse storage and logic circuits 46 and 47 perform the same function individually as described in connection with FIG. 1, that is, to store the pulses from pulse sources #1 and #2 respectively for later readout in the event that the pulse rate from pulse sources #1 and #2 exceeds the sampling rate for each pulse source.

The frequency of the clock 54 is set to limit the rate of transmission of pulses up the cable in accordance with the frequency response of the transmission system. For the utilization of the flip-flop 51 as a memory for the pulse source *n*, the condition must first be satisfied that the maximum rate at which pulses are generated from the pulse source *n* will not exceed the sample rate of these pulses (i.e., the rate at which gate 52 is energized). Obviously, if this were the case for pulse sources #1 and #2, then flip-flops could be utilized in place of the pulse storage and logic circuits 46 and 47. Of course, the pulse storage and logic circuits 46 and 47 allow the maximum instantaneous pulse rate of the pulse source to be greater than the sample rate.

Now referring to the circuitry at the surface of the earth, the pulses transmitted up the cable on the conductor pair 19 are applied to a suitable amplifier 55, which could comprise for example a differential amplifier for supplying a surface ground reference potential. The ground designations are shown on the circuitry at the surface of the earth to represent the fact that this ground reference has been supplied by amplifier 55. (Ground designations have been left off of the downhole circuit in both FIGS. 1 and 3 but obviously are assumed to be present.) The output from amplifier 55 is supplied to a positive pulse detector 56 and negative pulse detector 57 which act to separate the positive and negative pulses. This could take the form of diodes for example.

Considering the negative channel or synchronization channel first, the output pulses from negative pulse detector 57, designated $t_{0s}$, are supplied to a suitable delay circuit 58 which could comprise a one-shot for example. The output pulses from delay 58 are supplied to a pulse generator or one-shot 59, which is energized by the trailing edge of the pulses from delay 58. The output pulses from one-shot 59 are supplied to a gate circuit 60 and to another delay and one-shot circuit 61 which is identical to the delay 58 and one-shot 59. The output from delay and one-shot 61 is supplied to a gate circuit 62 and to another delay and one-shot circuit 63, whose output is supplied to another gate circuit 64.

The positive pulses from positive pulse detector 56 are supplied to the inputs of gates 60, 62 and 64. The outputs from gates 60, 62 and 64 are supplied to a plurality of pulse rate to DC converters designated 65, 66 and 67 respectively which act to convert the rate of pulses applied thereto to a DC signal proportional to such pulse rate. These DC signals are supplied to separate galvanometers of a multichannel recorder 68 which is driven as a function of depth by the shaft 35.

The delay of one-shots 58, 61 and 63 are set equal to the period of the signal from clock 54 in the downhole apparatus. That is to say, they are set equal to the time intervals between pulses from the ring counter 53 so as to energize gates 60, 62 and 64 at the proper time to properly decommutate or separate the data or information pulses from the downhole pulse sources #1, #2 . . . and *n*. Referring to FIG. 4B, there are shown the time intervals during which gates 60, 62 and 64 are energized. The time interval during which each gate 60, 62 or 64 is energized, is set less than the time duration of the pulses from positive pulse detector 56 so as to eliminate the switching transients of gates 60, 62 and 64 from being applied to the pulse rate to DC converters.

Thus, it can be seen that by utilizing the apparatus of FIG. 3, pulses from a plurality of pulse sources can be transmitted to the surface of the earth in digital form, (i.e. the pulse amplitude is not representative of information except as to the presence or absence of a pulse) utilizing the maximum permissible rate of transmission without losing any pulses due to the low frequency response (i.e. low repetition rate) of the transmission system, including the transmission medium (conductor pair 19 in this case).

However, there is one problem that may occur in this type of transmission system which is that the frequency of the clock 54 contained within the downhole circuitry may drift due to adverse downhole environmental conditions. It can be seen that if the clock 54 should drift substantially, the delay of the delay circuits 58, 61 and 63 at the surface of the earth may not be accurate and thus the gates 60, 62 and 64 would not open at the proper time thus losing the data pulses $x_1$, $x_2$, or $x_n$, or gating them to the wrong channel. One way of elevating this problem is to monitor the frequency or pulse rate of the negative synchronization pulses $t_{0s}$ from negative pulse detector 57 and adjust the delay time of the delay circuits 58, 61 and 63 in accordance therewith. This is represented in FIG. 3 by closing a switch 69 which supplies the negative going synchronization pulses from negative pulse detector 57 to a pulse rate to DC converter 70 whose DC output signal is utilized to control the delay time of delay circuits 58, 61 and 63. This change in time delays of the delay circuits can be readily accomplished in accordance with known techniques as, for example, if the delay circuits are considered to be one-shots, the DC control signal from pulse rate to DC converter 70 could be utilized to vary the voltage supplying the timing network of these one-shots.

Another scheme that could be utilized is represented in FIG. 3 by the dotted line conductors. In this alternative arrangement, the negative going pulses from negative pulse detector 57 are applied to the set input of a flip-flop 71 whose "one" output is supplied to a suitable filter 72 which provides a DC control signal which is proportional to the average "on-time" of flip-flop 71 (that is the average time interval during which there is an output signal from flip-flop 71). This DC signal from filter 72 is utilized to adjust the phase and frequency of a voltage controlled oscillator 73 which drives a ring counter 74. Ring counter 74 could be considered to include one-shots on the outputs thereof like ring counter 53 in the downhole circuitry. The ring counter 74 supplies output signals designated $t_0'$, $t_1'$, $t_2'$ . . . and $t_n'$ at selected time intervals, which time intervals correspond to the timing of ring counter 53 in the downhole circuitry. These output signals $t_1'$, $t_2'$, and $t_n'$ are then supplied to the gates 60, 62 and 64 respectively to energize them at the proper times. One of the output signals from the ring counter is supplied to the reset input of flip-flop 71. Desirably, the median or center output signal from ring counter 74 could be used for this purpose. Thus, in FIG. 3, assuming there are three information signals and one synchronization signal (four all together), then the $t_2'$ output can be used to reset flip-flop 71 thus giving a 50—50 on-off time. If a 50—50 on-off time cannot be achieved because the total number of channels is an even number, then the control level to voltage controlled oscillator 73 can be suitably adjusted to compensate.

Concerning the operation of this means for adjusting the frequency of voltage controlled oscillator 73 so as to adjust the timing of the energization of gates 60, 62 and 64, the relative timing of the signals applied to the "set" and "reset" inputs of flip-flop 71 will be maintained at a prescribed time relationship to each other by the output signal from filter 72 adjusting the frequency of the voltage controlled oscillator 73. To better understand this, refer to FIG. 4C where there are shown the negative synchronization pulses $t_{0s}$ from negative pulse detector 57 and the $t_2'$ pulses from ring counter 74. Looking at FIG. 4D, there is shown the output pulses from flip-flop 71. It can be seen that the leading edge of the negative synchronization pulse $t_{0s}$ turns flip-flop 71 on and the leading edge of the $t_2'$ pulse from ring counter 74 resets the flip-flop 71. The dotted line of FIG. 4D shows the DC level of the signal from filter 72 applied to voltage controlled oscillator 73 when the wave form from flip-flop 71 is as represented in FIG. 4D.

Now referring back to FIG. 4C, there is shown a dotted line pulse $t_2''$ which represents the voltage controlled oscillator 73 getting out of relative synchronization with the negative synchronization pulses $t_{0s}$. (Actually, the two pulses $t_{0s}$ and $t_2'$ are considered to be in synchronization when the "on-time" and "off-time" of flip-flop 71 are equal in this example.) In this manner, the DC level of the control signal applied to voltage controlled oscillator 73 can either increase or decrease as conditions require. Now referring to FIG. 4E, there is shown the output wave form from flip-flop 71 for this "out of synchronization" occurrence and the resulting DC control signal (dotted line). It can be seen that the on-time in FIG. 4E is much less than in FIG. 4D, thus causing the DC level from filter 72 to decrease. This decrease in amplitude of the control signal to voltage controlled oscillator 73 causes the frequency of voltage controlled oscillator 73 to increase slightly so as to bring the pulse $t_2''$ back to the $t_2'$ position and pull the DC level from filter 72 back to the level shown in FIG. 4D. Thus, it can be seen that this feed back circuit is a phase and frequency locked loop which insures that the energization of gates 60, 62 and 64 are always at the proper times regardless of the frequency drift of clock 54. Thus, the frequency of oscillator 73 is maintained substantially equal to the effective transmission frequency, i.e., the frequency of the downhole commutating clock 54.

Figure 5:
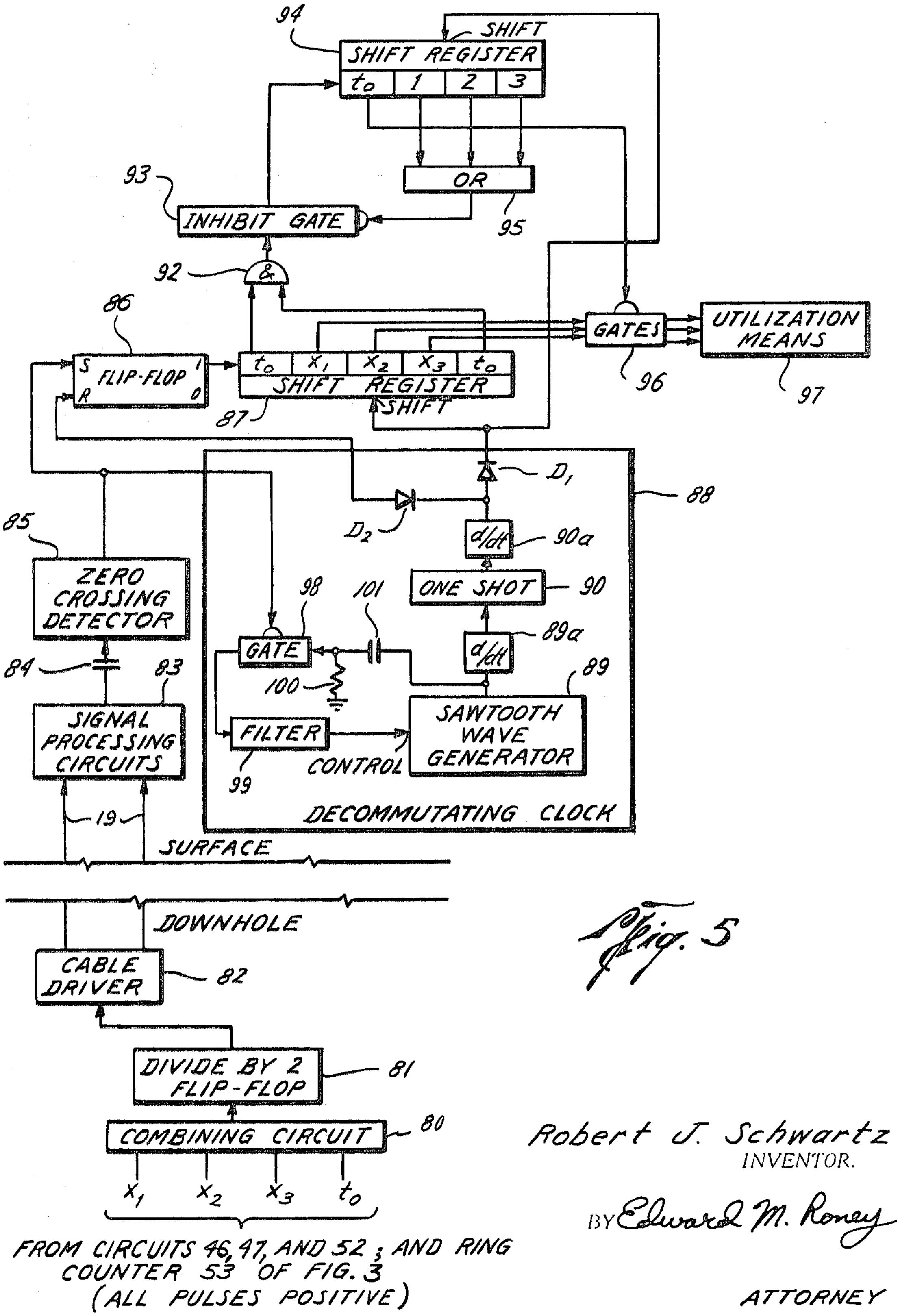
FIG. 5 shows another embodiment of the present invention for transmitting signals from a tool in a borehole to the surface of the earth along with apparatus at the surface of the earth for processing the transmitted signals.

Referring now to FIG. 5, there is shown another embodiment of the present invention for effectively increasing the band width of a transmission medium beyond its normal band width. First, this embodiment will be shown in a multichannel multiplexing arrangement. Thus, in FIG. 5, a plurality of information pulses $x_1$, $x_2$, and $x_3$ along with a synchronization pulse $t_0$ are applied to a combining circuit 80, which could take the form of an OR gate. These pulses $x_1$, $x_2$, $x_3$ and $t_0$ are the same as the similarly designated pulses of FIG. 3 with the exception that the synchronization pulse $t_0$ is positive rather than negative. The remainder of the circuitry of FIG. 5 for generating the pulses $x_1$, $x_2$, $x_3$ and $t_0$ can be the same as the circuitry of FIG. 3 for generating these pulses. The output pulses from combining circuit 80 are supplied to a "divide by two" flip-flop 81 which could comprise, for example, a trigger flip-flop. The output of flip-flop 81 is supplied to a cable driver 82 which supplies the signals from the downhole apparatus via the conductor pair 19 to the surface of the earth.

At the surface of the earth, these pulses are supplied to suitable signal processing circuits 83 which could comprise an amplifier for amplifying the received signals and supplying the ground reference potential at the surface of the earth as well as suitable automatic bias and gain control circuits. (The ground designations in FIG. 5 are omitted for brevity but are, of course, assumed to be present.) Circuits 83 may also comprise rectifier means for eliminating undesirable undershoots. The output from signal processing circuits 83 are coupled via a capacitor 84 to a zero crossing detector 85. The capacitor 84 acts to reference the signals supplied to zero crossing detector 85 to zero potential, i.e., zero potential will be the average potential. Whenever the signals applied to zero crossing detector 85 cross zero volts, a short duration pulse is supplied to the input of a set-reset flip-flop 86. A full-wave rectifier could be utilized in place of zero crossing detector 85 to reconstruct the "return to zero" form of the transmitted signal. The "1" output of flip-flop 86 is applied to a five stage shift register 87. The stages of shift register 87 are designated $t_0$, $x_1$, $x_2$, $x_3$, and $t_0$.

The clock or shift pulses for shift register 87 are derived from a decommutating clock 88 whose frequency is the same as the commutating clock 54 downhole (FIG. 3). The decommutating clock also provides the reset pulses to flip-flop 86 via another output lead. The first and last stage (the "1" output of the flip-flops) of shift register 87 are coupled to the inputs of an AND gate 92 whose output is coupled through an inhibit gate 93, if unergized, to a four-stage shift register 94 which is clocked or shifted by the pulses from the decommutating clock 88. These stages are designated $t_0$, 1, 2, and 3 from left to right. The outputs from the last three stages 1, 2, and 3 of shift register 94 (the "1" outputs of the flip-flops) are supplied via an OR gate 95 to the control terminal of inhibit gate 93. The outputs from the middle three stages of shift register 94, designated $x_1$, $x_2$, and $x_3$, (the "1" outputs of the flip-flops) are supplied to individual gate circuits 96, which individually supply the pulses from the various stages of shift register 94 to individual ones of utilization means 97, which could include pulse rate to DC converters and recorder as in FIG. 3. The gates 96 are energized from the "$t_0$" output of shift register 94.

Figures 6A, 6B, 6C, 6D, 6E, 6F, 6G, 6H:
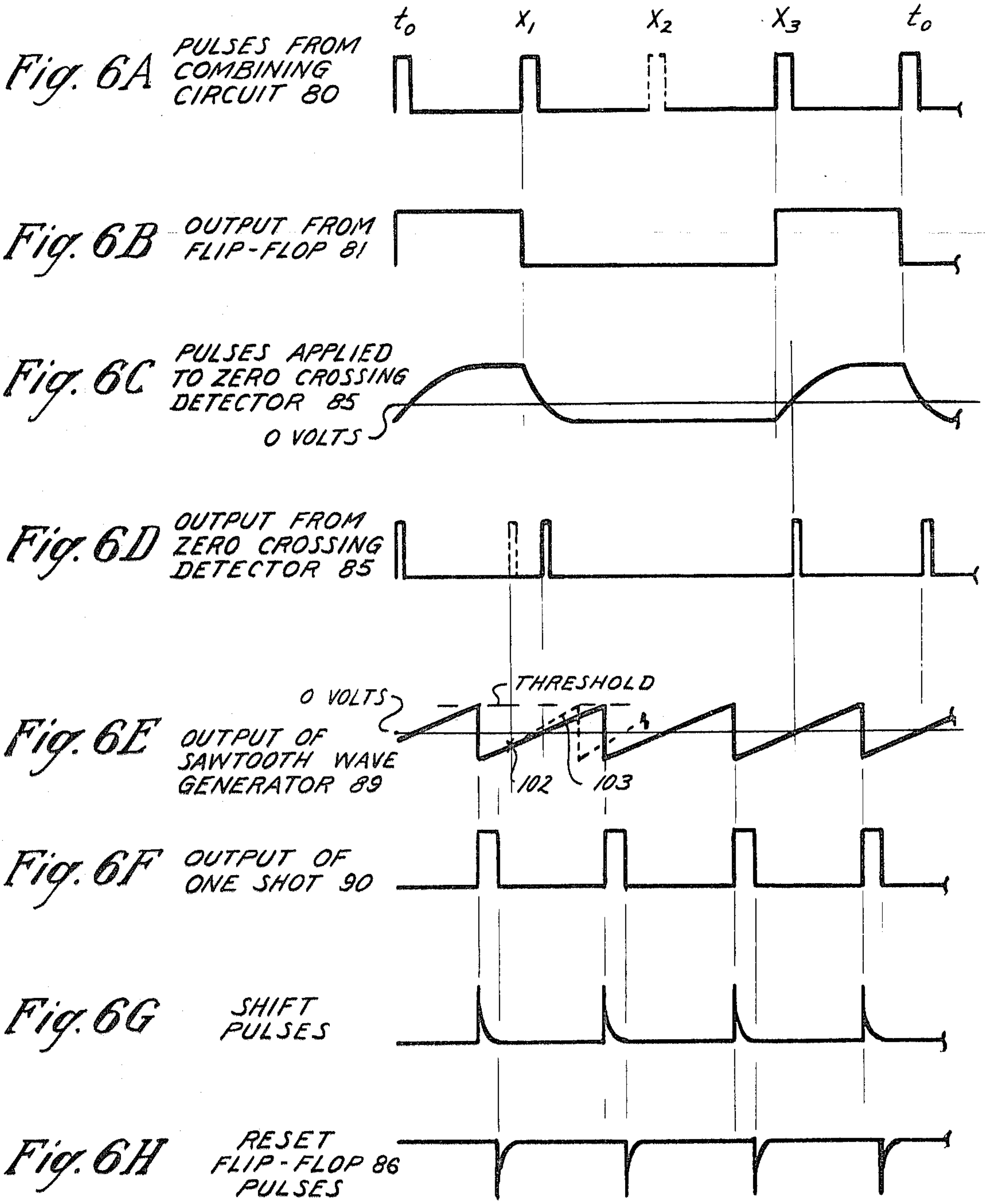
FIGS. 6A–6H show the wave forms at various points in the apparatus of FIG. 5.

Now concerning the operation of the above-mentioned portion of the apparatus of FIG. 5, refer to FIGS. 5, 6A–6D, 6G and 6H in conjunction. First, concerning the downhole apparatus, the various pulses supplied to combining circuit 80 are shown in FIG. 6A. The $x_2$ pulse is shown in dotted form to represent the fact that, in this example, no pulse is present during the time period allotted to the information source corresponding to $x_2$ (i.e., pulse source #2 in FIG. 3). FIG. 6B shows the output wave form from flip-flop 81. Since flip-flop 81 changes state each time a pulse is supplied thereto, it can be seen by comparing FIGS. 6A and 6B that the pulses $t_0$, $x_1$, $x_3$ and $t_0$ again cause the output from flip-flop 81 to change state, but the absence of a pulse during the $x_2$ sample period will leave the flip-flop 81 in the last preceding state. Thus, in the downhole circuitry of FIG. 5, it can be seen that the presence of a pulse is indicated by a change in state of flip-flop and the absence of a pulse is indicated by the absence of a change in state of flip-flop 81. This type of operation is commonly referred to as a "non-return to zero" operation.

Now concerning the operation of the apparatus at the surface of the earth of FIG. 5, FIG. 6C represents the wave shape of the pulses applied to zero crossing detector 85. It can be seen that the capacitor 84 supplies an average zero potential, i.e., the areas above and below zero potential are approximately the same. Looking at FIG. 6D, there are shown the output pulses of zero crossing detector 86 which are generated every time zero potential is crossed (the solid line pulses). To obtain positive polarity pulses regardless of the direction of crossing zero potential, zero crossing detector 85 could include a suitable full-wave rectifier or trigger. Comparing FIGS. 6A and 6D, it is seen that the regenerated pulses from trigger 86 correspond to the pulses supplied to combining circuit 80 downhole but time shifted slightly, due to the cable response.

Referring to FIG. 6G, there are shown the shift pulses from decommutating clock 88 which are applied to shift registers 87 and 94. Comparing FIGS. 6D and 6G in conjunction with FIG. 5, it can be seen that the pulses of FIG. 6D, which are applied to flip-flop 86, place flip-flop 86 in the proper state (e.g., the "1" state if a pulse is present). Then, when a shift pulse of FIG. 6G is applied to shift register 87, the bit (1 or 0) in flip-flop 86 is applied to the first stage ($t_0$) of shift register 87. (Shift register 87 may have "type D" flip-flops so that the output of flip-flop 86 is not applied to the first stage of shift register 87 until a shift pulse is applied thereto.) Then, a short time later, flip-flop 86 is reset by the reset pulses of FIG. 6H from decommutating clock 88.

It can be seen by comparing FIGS. 6A and 6D with FIGS. 6B and 6C that the frequency of the signal of FIGS. 6B and 6C transmitted over the cable is one-half of the downhole sample frequency of the clock 54 of FIG. 3 or one-half of the maximum possible frequency of the pulses of FIGS. 6A and 6D. However, if an information pulse is not present during each sample interval, the transmission frequency will be effectively less than one-half that of the sample frequency. Thus, it can be seen that by utilizing the transmission apparatus of FIG. 5, at least twice as much information can be transmitted over a given cable to the surface of the earth than was possible with the apparatus of FIG. 3.

However, when utilizing the "non-return to zero" transmission method represented in FIG. 5, the location of the synchronization pulses is not easy since opposite polarity synchronization pulses (negative in FIG. 3) cannot easily be generated due to the fact that the information pulses can be either positive or negative with this "non-return to zero" method. To accomplish synchronization under these conditions, the surface apparatus of FIG. 5 supplies all of the pulses received at the surface of the earth to the shift register 87 which has a capacity equal to all of the transmitted information pulse or bit positions along with two synchronization pulse positions, i.e., one cycle plus one more synchronization pulse. Since it is known that there will always be a synchronization pulse $t_0$ generated downhole and therefore a corresponding voltage change transmitted to the surface of the earth, the apparatus of FIG. 5 acts to shift all of the received pulses into the shift register 87 and continuously examines the first and last stage of the shift register 87 to detect the coincidence of a "1" in both stages. That is to say, since there is always a "1" in both the first and last stages of shift register 87 during the synchronization time period, i.e., when a synchronization pulse is received at the surface and placed in the first stage of register 87, a coincidence is detected by AND gate 92 which places a pulse or "1" in the first stage ($t_0$) of shift register 94 thus opening all of the gates 96 provided inhibit gate 93 is unenergized. The information present in the middle three stages $x_1$, $x_2$, and $x_3$ of shift register 87 will then be gated to the utilization means 97.

However, there is one other matter to be taken care of. This concerns the possibility that a combination of information pulses $x_1$, $x_2$ and $x_3$ will produce "ones" in the first and last stage of shift register 87 thus causing a false synchronization indication and erroneous energization of gates 96. To prevent this occurrence, inhibit gate 93 is energized via OR gate 95 if there is a "1" in any one of the last three stages 1, 2, or 3 of the four stage shift register 94. The basis for this is that if a synchronization pulse has been detected, thus causing a "1" to be placed in the first or "$t_0$" stage of shift register 94, the subsequent shift pulses from decommutating clock 88 will cause this "1" to propagate through the last three stages of shift register 94. During the times that this "1" is in any one of the last three stages of shift register 94, inhibit gate 93 will be energized thus prohibiting anymore "ones" from being placed in shift register 94 and thus inhibiting the energization of gates 96. Another way of saying this is that after a synchronization pulse has been detected and placed in the first or $t_0$ stage of shift register 94, any other detection of synchronization pulses is inhibited for three clock periods thereafter, i.e., the time for the "1" placed in the first or $t_0$ stage of shift register 94 to shift out of shift register 94.

Concerning starting this operation when the logging operation is initiated generally at the bottom of the borehole, it is merely necessary to allow the apparatus to operate for a short time interval to insure that the detection of synchronization pulses is in step with the transmission of synchronization pulses. Thus, if for example, "ones" should be located in the first and last stages of shift register 87 at the improper time, i.e., when these "ones" are due to information pulses and not synchronization pulses, the application of a pulse to shift register 94 will be inhibited for three clock periods thereafter at which time inhibit gate 93 will become de-energized in readiness for another synchronization pulse. If such a pulse is not present, the apparatus will, in effect, wait until such synchronization occurs.

It can be seen that once the shift registers 87 and 94 are running in synchronization with each other, i.e., the downhole commutation and surface decommutation are synchronized, they will remain in synchronization, barring a transmission failure. In such event of a transmission failure, it is clear that after some time interval of normal operation, the downhole commutating and surface decommutating apparatus will regain synchronization in the same manner as discussed above.

It is to be understood that, while only three information bits (i.e., $x_1$, $x_2$, and $x_3$) were shown in this example, any number could be used, as in the FIG. 1 embodiment, thus requiring the shift registers 87 and 94 to be larger. In addition, while the coincidence of only two synchronization pulses was required to establish a synchronization condition, it is to be understood that any number of synchronization pulses could be required for establishing this condition. In such a case, the storage capacity of shift register 87 would need to be greater. Additionally, this particular decommutating arrangement could be used with the multiplexing scheme of FIG. 3 if unipolarity transmission was desired, i.e., the synch and data pulses are of the same polarity.

There is one other type of synchronization which should be accounted and that is to insure that the frequency of the decommutating clock 88 at the surface of the earth is in synchronization with the commutating clock 54 (FIG. 3) downhole. Before going into this, it would first be desirable to look at the internal configuration of the decommutating clock 88. A sawtooth wave generator 89 supplies its output sawtooth wave voltage, shown in FIG. 6E, to a differentiator 89a which provides a sharp negative spike in response to a periodic characteristic of the sawtooth wave, which in this case, is each time the output voltage abruptly changes. A monostable multivibrator or one-shot 90 is responsive to this resulting negative spike to generate a short, fixed duration pulse, shown in FIG. 6F. This output pulse from one-shot 90 is applied to a differentiator 90a which couples its positive leading edge, shown in FIG. 6G, through a forward-biased diode $D_1$ as the shift pulses to shift registers 87 and 94. The negative lagging edge of the pulses of FIG. 6F, after differentiation, are fed through a negative-biased diode $D_2$ to reset flip-flop 86. The output from sawtooth wave generator 89 is also applied via an R–C network 100–101 (which provides an average zero potential as shown in FIG. 6E) to the input of a gate circuit 98 which is energized by the output pulses of FIG. 6D from zero crossing detector 85 to sample the sawtooth wave voltage. The output pulses from gate 98 are filtered by a suitable filter 99, which supplies a DC control signal to the sawtooth wave generator 89. If sawtooth wave generator 89 takes the form of a constant current charging up a capacitor, this DC control could vary the current by biasing a transistor in the current source, for example. The R–C time constant of resistor 100 and capacitor 101 should be high so as to not distort the sawtooth wave with the resistance of resistor 100 low to present a low impedance to filter 99. Filter 99 should, then, have a high input impedance. By this means, the gate 98 will supply the instantaneous voltage output of sawtooth wave generator 89 existing at the time that gate 98 is energized and referenced to zero volts average, to the filter 99.

Referring to FIGS. 6D and 6E to better understand this operation, the output pulses from zero crossing detector 85 are shown in FIG. 6D and the output wave form from sawtooth wave generator 89 is shown in FIG. 6E. The pulses of FIG. 6D which energize gate 98 are shown sampling the voltage of the sawtooth wave in FIG. 6E at approximately zero volts. In this event, the DC control voltage to sawtooth wave generator 89 will be zero volts. This is the sought after condition. By so doing, the shift pulses and reset pulses will occur a short time after each pulse of FIG. 6D. By comparing the wave forms of FIGS. 6D–6H, it can be seen that the pulses from zero crossing detector 85, which are effectively the transmitted pulses received at the surface, are in synchronism (though offset) with the decommutating clock pulses of FIGS. 6G and 6H. Since the output pulses from zero crossing detector 85 are utilized to sample the voltage from sawtooth wave generator 89, it can be seen that in the operation depicted in FIGS. 6D–6H, this sampled voltage will always be zero volts and thus sawtooth wave generator 89 will continue to operate at the proper frequency and phase since no control voltage is supplied to generator 89.

Now assume that the output pulses from zero crossing detector 85 happen to get out of frequency or phase synchronism with the output pulses of trigger 91, caused for example by a drift in the frequency of the downhole clock 54 of FIG. 3. This event is represented by the dotted line wave form in FIG. 6D. Upon this occurrence, the voltage of sawtooth wave generator 89 will be sampled at the point 102 in FIG. 6E. Since this voltage level is less than zero volts, it can be seen that pulses of a given negative amplitude will be supplied to filter 99 thus causing a negative DC control signal to adjust the frequency of sawtooth wave generator 89. This negative DC control signal will cause the sawtooth wave shape of FIG. 6E to increase slope as shown by the dotted line 103. This change in slope will continue until the sampled voltage is again zero volts. If the frequency of the FIG. 6D pulses decreases, a positive voltage will be applied to generator 89 to cause the slope of the sawtooth wave to decrease.

Thus, it can be seen that this phase and frequency control circuit will act to maintain the sampled sawtooth voltage at approximately zero volts. This has the effect of reducing any errors due to pulses not being always transmitted since, if a pulse is not transmitted, the voltage applied to filter 99 will still be zero. Thus, this operation will maintain the frequency of the decommutating clock 88 at substantially the effective frequency of the transmitted signals, i.e., the frequency of the downhole commutating clock 54 of FIG. 3, and in the proper phase relationship for the operation of the surface decommutating apparatus. This frequency synchronization scheme could also be utilized with the apparatus of FIG. 3.

It can thus be seen that with the novel apparatus of FIG. 5, a transmission system for tranmitting pulses from a plurality of downhole pulse sources has been provided wherein a maximum amount of information can be transmitted even though the frequency response of the cable is limited. In addition, synchronization of the downhole commutating and surface decommutating apparatus for both location of the synchronization pulses as well as frequency drift of the downhole commutating clock can be readily accomplished with highly accurate but yet inexpensive synchronizing apparatus.

It is to be understood that this novel "non-return to zero" transmission technique could be utilized with an zero" transmission technique could be utilized with any number of downhole information pulse sources, including one such information source. This can be seen by referring back to FIG. 1 where the output terminal of pulse storage and logic circuit 40 is shown connected by dash-dot lines or conductors to the input of a trigger flip-flop 105, which acts in the same manner as the "divide by 2" flip-flop 81 of FIG. 5. The output signals from flip-flop 81 are then supplied to a cable driving amplifier 106 for transmitting the output signals to the surface of the earth. The conductor to cable driving circuit 28 is X'ed out for this embodiment. This would then allow the transmission rate in FIG. 1 to be twice as great, for the same reasons discussed earlier. However, it may at times be desirable to use the "return to zero" or "unique pulse per event" transmission system described earlier in connection with FIG. 1 in the event that opposite polarity transmission is desired for another source of information.

While there have been described what are at present considered to be preferred embodiments of this invention, it will be obvious to those skilled in the art that various changes and modifications may be made therein without departing from the invention, and its is, therefore, intended to cover all such changes and modifications as fall within the true spirit and scope of the invention.

What is claimed is:

1. A method of decommutating signals transmitted on a time sharing basis from a plurality of sources in a well tool in a borehole to the surface of the earth, wherein synchronization pulses are also transmitted, comprising:

(a) receiving the transmitted signals at the surface of the earth;

(b) generating timing signals;

(c) gating the signals corresponding to each particular source in the tool to separate utilization means in response to the timing signals;

(d) comparing the frequency and phase of the timing signals with the frequency and phase of the received synchronization pulses; and (e) generating a signal to adjust the frequency and phase of the timing signals to correspond with the frequency and phase of the synchronization pulses in response to the compared timing and synchronization signals.

2. A method of decommutating signals transmitted on a time sharing basis from a plurality of sources in a well tool in a borehole to the surface of the earth, wherein synchronization signals are also transmitted, and supplying the signals to a plurality of utilization means corresponding to the plurality of sources, comprising:

(a) receiving the transmitted signals at the surface of the earth;

(b) storing representations of the received signals;

(c) examining the stored signals to determine a synchronization condition;

(d) gating the signals derived from the plurality of sources in the tool to the proper utilization means in response to a detected synchronization condition; and (e) inhibiting the gating of the signals to the utilization means for a given interval after a synchronization condition has been detected.

3. Apparatus for transmitting pulse type signals from a tool in a borehole to the surface of the earth over a transmission medium, comprising:

(a) a plurality of pulse sources at the tool for generating information pulses;

(b) pulse storing means for individually storing the pulses from each of the pulse sources;

(c) means for sequentially interrogating the pulse storing means for each pulse source to determine the presence of a stored pulse and periodically generating a synchronization pulse having a specified relationship to the order of interrogation of said pulse storing means;

(d) means for generating a transmission signal which changes state each time an information pulse is detected in a storing means and a synchronization pulse generated;

(e) means for supplying the transmission signal to the transmission medium for transmission to the surface of the earth;

(f) means at the surface of the earth for detecting changes in state of said transmission signal to provide representations of said information and synchronization pulses;

(g) surface storing means for storing said representations of information and synchronization pulses;

(h) synchronization detection means for interrogating at least one stage of said storing means to determine if said synchronization and information pulses are properly positioned relative to one another and generating a synchronization condition output signal if a synchronization condition exists; and (i) means responsive to said output signal for gating information signals stored in said surface storing means to selected utilization devices.

4. The apparatus of claim 3 wherein said surface storing means comprises a first shift register operating at the frequency of interrogation of said interrogating means, and wherein said synchronization detection means includes means for interrogating at least two selected stages of said shift register for the presence of synchronization (b) gating means coupled to each one of the utilization means and adapted to be energized;

(c) circuit means, including timing means, responsive to at least a portion of the received signals for sequentially energizing the gating means in timed relationship to the transmitted signals so as to gate the signals corresponding to each source to the proper utilization means; and (d) frequency adjustment means responsive to the frequency of at least a portion of the transmitted signals for adjusting the frequency of the timing means to correspond with the effective frequency of the transmitted signals so that the frequency of decommutation will correspond to the frequency of the transmitted signals.

14. The apparatus of claim 13 wherein the circuit means is responsive to the synchronization signals for sequentially energizing the gating means and the means for adjusting the timing of the timing means is responsive to the frequency of the synchronization signals.

15. The apparatus of claim 13 wherein the timing means includes a signal generator for generating signals adapted to energize the gating means at the frequency of the transmitted signals, and the means for adjusting the timing of the timing means includes means responsive to the frequency of at least a portion of the transmitted signals and the frequency of at least a portion of the timing means generated signals for adjusting the frequency of the timing means generated signals to correspond with the effective frequency of the transmitted signals.

16. Apparatus for decommutating signals transmitted on a time sharing basis from a plurality of sources in a well tool in a borehole to the surface of the earth wherein synchronization signals are also transmitted and supplying the signals to a plurality of utilization means corresponding to the plurality of sources, comprising:

(a) means at the surface of the earth for receiving the transmitted signals;

(b) gating means coupled to each one of the utilization means and adapted to be energized;

(c) circuit means, including timing means, responsive to at least a portion of the received signals for energizing the gating means so as to gate the signals corresponding to each source to the proper utilization means, said timing means including generating means for generating a substantially sawtooth wave shape; means responsive to a periodic characteristic of the generated wave shape for generating timing signals useful in energizing the gating means; and (d) means responsive to the effect frequency of the transmitted signals for adjusting the timing of the timing means to correspond with the effective frequency of the transmitted signals, said adjusting means including means responsive to the transmitted signals received at the surface for sampling the magnitude of the sawtooth wave at selected times; and means responsive to the sampled magnitude of the sawtooth wave for adjusting the timing of the generating means to maintain the sampled magnitude at a selected, substantially constant magnitude.

17. The apparatus of claim 16 wherein the circuit means for energizing the gating means further includes:

(1) first shift register means, shifted by the timing signals, for storing representations of the received signals;

(2) means for examining selected stages of the shift register means for determining a synchronization condition and generating a synchronization condition signal in response to the synchronization condition;

(3) second shift register means, shifted by the timing signals, for storing the synchronization condition signals, at least one stage of the second shift register means coupled to the gating means for energizing the gating means; and (4) means for inhibiting the application of the synchronization condition signals to the second shift register for a predetermined number of shift times after a synchronization condition signal has been initially stored in the second shift register means.

18. Apparatus for decommutating information signals transmitted on a time sharing basis from a plurality of sources in a well tool in a borehole to the surface of the earth, wherein a synchronization signal is transmitted after a selected number of information signals have been transmitted, and supplying the signals to a plurality of utilization means corresponding to the plurality of sources, comprising:

(a) means at the surface of the earth for receiving the transmitted signals;

(b) storing means for storing representations of the received signals, the storage capacity of said storing means being sufficient to store at least two synchronization signals and all of the information signals therebetween;

(c) gating means coupled between each one of the utilization means and selected stages of the storing means and adapted to be energized;

(d) means for examining the stored signals to determine a synchronization condition and generating a synchronization condition signal if said synchronization condition exists; and (e) means responsive to the synchronization condition signal for energizing the gating means so as to gate the signals derived from the plurality of sources in the tool to the proper utilization means.

19. The apparatus of claim 18 wherein the plurality of sources in the tool produce information pulses and the representations of the received signals supplied to the storing means comprise a pulse train in which the pulse or bit positions relative to each synchronization pulse correspond to the particular sources in the tool, the storing means comprising shift register means having a storage capacity to store at least two synchronization pulses plus all of the information pulses therebetween, and the means for examining the stored signals includes means responsive to a predetermined condition in selected stages of the shift register for generating a synchronization condition signal for energizing the gating means.

20. The apparatus of claim 19 wherein the means for examining the stored signals further includes means responsive to the generated synchronization condition signal for inhibiting the energization of the gating means for the interval between successive synchronization pulses.

21. A method of processing pulse type signals for transmission from a tool in a borehole to the surface of the earth over a transmission medium, comprising:

(a) generating pulses at a random rate from a pulse source;

(b) counting the generated pulses with a counting means;

(c) interrogating the counting means for the presence of any stored pulses over the same time interval that pulses are being counted; and (d) supplying a transmission pulse to the transmission medium for transmission to the surface of the earth upon the detection of a count in the counting means.

22. The method of claim 21 wherein the step of supplying pulses to the transmission medium includes inhibiting the transmission of another pulse to the surface of the earth for a fixed time interval after the transmission of a first pulse.

23. The method of claim 21 and further including the step of subtracting one pulse from the total number of pulses counted by the counting means for each pulse transmitted to the surface of the earth.

24. A method of processing pulse type signals for bits and generating a first output signal if said synchronization bits are detected; a second shift register operating at said interrogation frequency for storing said first output signal; means for inhibiting the storing of any further first output signals for a selected interval corresponding to the interval between successive synchronization pulses, said synchronization condition output signal being generated in response to every uninhibited first output signal whereby said synchronization detection means will generate said synchronization condition output signal when said synchronization and information pulses are properly positioned relative to one another.

5. Apparatus for processing pulse type signals which occur at a random rate for transmission of transmission pulses from a tool in a borehole to the surface of the earth over a transmission medium comprising: digital counting means for receiving and counting pulse signals occurring at a random rate; means for interrogating the counting means for the presence of any counted pulses; means for providing a transmission pulse upon interrogation and detection of a pulse count in said counting means including means for inhibiting the development of a subsequent transmission pulse and a subsequent count pulse for a preselected time interval following the development of a given transmission pulse to provide transmission pulses at a preselected rate.

6. Apparatus for processing pulse type signals which occur at a random rate for transmission of transmission pulses from a tool in a borehole to the surface of the earth on a cable having a defined frequency response comprising: digital counting means for receiving and counting pulse signals occurring at a random rate; means for interrogating the counting means for the presence of any counted pulses; and means for providing a transmission pulse for an electrical cable upon interrogation and detection of a pulse count in said counting means including means for inhibiting development of a subsequent transmission pulse and a subsequent count pulse for a preselected time interval following the development of a given transmission pulse to provide transmission pulses at a rate optimized with respect to the frequency response of a cable.

7. Apparatus for processing pulse type signals for transmission from a tool in a borehole to the surface of the earth over a transmission medium comprising: a pulse source for generating pulses at a random rate; reversible counter means for counting the generated pulses; means for detecting the presence of a count in the counter and generating an output signal in response to the detection of a count; means responsive to the output signal for causing a pulse to be transmitted over the transmission medium to the surface of the earth; means responsive to the transmission of a pulse to the surface of the earth for reducing the total count of the reversible counter by one count; means for inhibiting the reversible counter from counting up while the counter is counting down; and means for temporarily storing a generated pulse from the pulse source in response to the inhibiting of the reversible counter from counting up, so that the generated pulse from the pulse source will not be lost while the reversible counter is counting down.

8. Apparatus for processing pulse type signals for transmission from a tool in a borehole to the surface of the earth over a transmission medium comprising: a pulse source for generating pulses at a random rate; digital counting means for counting the generated pulses; means for interrogating the counting means for the presence of any stored pulses; means for supplying a transmission pulse to the transmission medium for transmission to the surface of the earth upon the detection of a stored pulse in said counting means; means coupled to the counter for generating an inhibit signal in response to the full count capacity of the counter being attained; and means responsive to the inhibit signal for inhibiting the generated pulses from the pulse source from being applied to the counter.

9. Apparatus for processing pulse type signals for transmission from a tool in a borehole to the surface of the earth over a transmission medium comprising:

(a) a plurality of pulse sources for generating information pulses at a random rate;
(b) means for individually storing the generated information pulses from each of the pulse sources;
(c) means for sampling each of the pulse storage means in sequence to determine the presence of a stored pulse and generating a synchronization pulse having a relative time relationship to the sampling of each of the pulse storage means; and
(d) coupling means for coupling the sampled stored information pulses and the synchronization pulse to the transmission medium for transmission to the surface of the earth.

10. Apparatus for processing pulse type signals for transmission from a tool in a borehole to the surface of the earth over a transmission medium comprising:

(a) a plurality of pulse sources for generating information pulses at a random rate;
(b) means for individually storing the generated information pulses from each of the pulse sources;
(c) means for generating synchronization pulses and sequentially sampling the storing means corresponding to each pulse source on a time sharing basis to provide a pulse type signal with each information source having a designated bit position relative to each synchronization pulse; and
(d) means responsive to the pulse type signal for generating a transmission signal to be applied to the transmission medium for transmission to the surface of the earth, which transmission signal changes state each time one of the sampled or synchronization pulses changes state from the last preceding sampled or synchronization pulse.

11. The apparatus of claim 10 wherein the means for generating a transmission signal for transmission to the surface of the earth includes:

(1) means responsive to the sequential sampled and synchronization pulses for generating a transmission signal which changes magnitude each time one sampled or synchronization pulse changes magnitude from the last preceding sampled or synchronization pulse; and
(2) means for coupling the transmission signal onto the transmission medium for transmission to the surface of the earth.

12. The apparatus of claim 10 and further including separate utilization means at the surface of the earth corresponding to each information pulse source in the tool and means for decommutating the transmitted signals at the surface of the earth, which decommutating means comprises:

(a) means for converting the transmission signal back to the original pulse type form;
(b) surface storage means for storing a designated number of bit positions of the pulse type signal;
(c) means for examining the stored pulse type signal to determine the existence of a synchronization condition; and
(d) means responsive to the synchronization condition for connecting the stages of the surface storage means containing the information portion of the pulse type signal to the utilization means.

13. Apparatus for decommutating signals transmitted on a time sharing basis from a plurality of sources in a well tool in a borehole to the surface of the earth wherein synchronization signals are also transmitted and supplying the signals to a plurality of utilization means corresponding to the plurality of sources, comprising:

(a) means at the surface of the earth for receiving the transmitted signals;

transmission from a tool in a borehole to the surface of the earth over a transmission medium, comprising:

(a) generating information pulses from a plurality of pulse sources at a random rate;
(b) counting the pulses from each of the pulse sources in separate pulse counting means; and
(c) sampling each of the pulse counting means in sequence to determine the presence of at least one pulse in each pulse counting means over the same time interval that pulses are being counted and supplying a pulse to the transmission medium for transmission to the surface of the earth each time at least one stored pulse is detected.

25. A method of processing pulse type signals for transmission from a tool in a borehole to the surface of the earth over a transmission medium, comprising:

(a) generating discrete information pulses at the tool;
(b) generating a transmission signal in response to the generated information pulses which transmission signal changes amplitude level each time a pulse is generated so that a unidirectional change in the amplitude level of said transmission signal will occur in response to each generated discrete pulse;
(c) supplying the transmission signal to the transmission medium for transmission to the surface of the earth; and
(d) indicating the reception of an information pulse at the surface of the earth in response to each change in amplitude of the transmission signal.

26. The method of claim 25 wherein the step of indicating the reception of an information pulse comprises generating a pulse at the surface of the earth in response to each change in amplitude level of the transmission signal so as to reconstruct the discrete information pulses at the surface of the earth.

27. A method of decommutating signals transmitted on a time sharing basis for a plurality of sources in a well tool in a borehole to the surface of the earth, comprising:

(a) receiving the transmitted signals at the surface of the earth;
(b) generating timing signals in timed correspondence to the frequency of the transmitted signals;
(c) separating the signals corresponding to each particular source in the tool for application to separate utilization means in response to the timing signals; and
(d) adjusting the timing of the timing signals to correspond with the effective frequency of the transmitted signals in response to the frequency of the transmitted signals received at the surface so that the decommutation frequency will correspond with the frequency of the transmitted signals.

28. The method of claim 27 wherein the step of generating timing signals includes:

(1) generating a substantially sawtooth wave signal;
(2) generating the timing signals in response to a selected periodic characteristic of the sawtooth wave signal; and the step of adjusting the timing of the timing signals includes:
    (a) sampling the magnitude of the sawtooth wave signal at selected times in response to the transmitted signals received at the surface;
    (b) adjusting the timing of the timing means in response to the sampled magnitude to maintain the sampled magnitude at the selected, substantially constant magnitude.

29. A method of processing pulse type signals for transmission from a tool in a borehole to the surface of the earth over a transmission medium, comprising:

(a) generating information pulses from a plurality of pulse sources at a random rate;
(b) storing the pulses from each of the pulse sources in separate pulse storage means;
(c) sampling each of the pulse storage means in sequence to determine the presence of at least one pulse in each pulse storage means and generating a synchronization pulse at selected times relative to the sampling of the pulse storage means; and
(d) generating a transmission signal for transmission to the surface of the earth in response to the sampled information and synchronization pulses, which transmission signal changes state each time one of the sampled information or synchronization pulses changes magnitude from the last preceding sampled or synchronization pulse.

30. A method of decommutating information signals transmitted on a time sharing basis from a plurality of sources in a well tool in a borehole to the surface of the earth, wherein a synchronization signal is transmitted after a selected number of information signals have been transmitted, and supplying the signals to a plurality of utilization means corresponding to the plurality of sources, comprising:

(a) receiving the transmitted signals at the surface of the earth;
(b) storing a selected number of the received signals, said selected number of stored signals comprising at least two synchronization signals and all of the information signals therebetween;
(c) examining the stored signals to determine if said at least two synchronization signals are properly positioned relative to said information signals and generating an output signal indicative of such a synchronization condition; and
(d) gating the signals derived from the plurality of sources in the tool to the proper utilization means in response to said output signal.

31. Apparatus for use in the transmission of information from a tool in a borehole to the surface of the earth over a transmission medium, comprising:

(a) means at the tool for generating discrete information pulses;
(b) means responsive to the generated information pulses for generating a transmission signal which changes amplitude level each time an information pulse is generated so that a unidirectional change in the amplitude level of said transmission signal will occur in response to each generated discrete pulse;
(c) means for supplying the transmission signal to the transmission medium for transmission to the surface of the earth; and
(d) means at the surface of the earth for providing an indication of the reception of an information pulse in response to each change in amplitude level of the transmission signal.

32. The apparatus of claim 31 wherein the means for providing an indication of the reception of a pulse comprises means responsive to the transmission signal for generating a discrete pulse for each change in amplitude level of the transmission signal so as to reconstruct the information pulses at the surface of the earth.

References Cited

UNITED STATES PATENTS

| | | | |
|---|---|---|---|
| 2,802,951 | 8/1957 | Seevers | 340—18 |
| 2,883,548 | 4/1959 | Baker et al. | 250—83.3X |
| 2,884,534 | 4/1959 | Fearon et al. | 250—83.6 |
| 2,937,238 | 5/1960 | Mercier | 179—15 |
| 3,103,644 | 9/1963 | Burton | 340—18 |
| 3,309,521 | 3/1967 | Bargainer | 340—18X |
| 3,435,224 | 3/1969 | Zemanek | 340—18X |

RODNEY D. BENNETT, Primary Examiner

D. C. KAUFMAN, Assistant Examiner

U.S. Cl. X.R.

179—15; 250—83.6